US012123221B2

(12) United States Patent
Yurasits

(10) Patent No.: US 12,123,221 B2
(45) Date of Patent: Oct. 22, 2024

(54) MONITORING ACCESS

(71) Applicant: Comcast Cable Communications, LLC, Philadelphia, PA (US)

(72) Inventor: Bryan Yurasits, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/880,838

(22) Filed: Aug. 4, 2022

(65) Prior Publication Data

US 2023/0160232 A1 May 25, 2023

Related U.S. Application Data

(63) Continuation of application No. 17/025,031, filed on Sep. 18, 2020, now Pat. No. 11,447,977, which is a continuation of application No. 16/028,246, filed on Jul. 5, 2018, now Pat. No. 10,815,693, which is a continuation of application No. 14/739,513, filed on Jun. 15, 2015, now Pat. No. 10,047,543.

(51) Int. Cl.

| | |
|---|---|
| ***E05B 45/06*** | (2006.01) |
| ***E05B 1/00*** | (2006.01) |
| *E05B 47/00* | (2006.01) |
| *G08B 13/08* | (2006.01) |

(52) U.S. Cl.

CPC ................ *E05B 45/06* (2013.01); *E05B 1/00* (2013.01); *E05B 2045/0615* (2013.01); *E05B 2045/063* (2013.01); *E05B 2047/0067* (2013.01); *E05B 2047/0068* (2013.01); *G08B 13/08* (2013.01)

(58) Field of Classification Search

CPC .... E05B 45/06; E05B 1/00; E05B 2047/0067; E05B 2045/063; E05B 2047/0068; E05B 2045/0615; G08B 13/08

See application file for complete search history.

(56) References Cited

U.S. PATENT DOCUMENTS

| | | | | |
|---|---|---|---|---|
| 4,796,010 | A | 1/1989 | Bland et al. | |
| 6,166,633 | A | 12/2000 | Wang | |
| 8,912,903 | B1 * | 12/2014 | Dounis | G08B 13/08 340/545.7 |
| 9,489,822 | B2 | 11/2016 | Nold | |
| 2007/0252407 | A1 | 11/2007 | Cavallucci et al. | |
| 2008/0068162 | A1 | 3/2008 | Sharma et al. | |
| 2008/0198006 | A1 | 8/2008 | Chou | |
| 2009/0040046 | A1 | 2/2009 | Browning, Jr. et al. | |
| 2010/0188199 | A1 | 7/2010 | Tanaka et al. | |
| 2010/0245087 | A1 | 9/2010 | Gerner et al. | |
| 2013/0215276 | A1 | 8/2013 | Cho | |

(Continued)

*Primary Examiner* — Hongmin Fan

(74) *Attorney, Agent, or Firm* — Banner & Witcoff, Ltd.

(57) ABSTRACT

Methods and systems are disclosed that, in some aspects, provide an opening mechanism comprising an interior and an exterior door handle and sensors to detect movement of each door handle. A door position sensor may be provided. An alarm module for generating an alarm may be connected to at least one of the sensors. A method may include receiving a door handle actuation signal, determining whether the door handle actuation signal is from an inside door handle or an outside door handle and performing a function. One or more methods include determining an event, including an attempted entry, a forced entry and an incomplete entry.

21 Claims, 6 Drawing Sheets

(56) References Cited

U.S. PATENT DOCUMENTS

| | | | | |
|---|---|---|---|---|
| 2014/0062466 | A1 | 3/2014 | Thibault et al. | |
| 2015/0102898 | A1 | 4/2015 | Huennekens et al. | |
| 2015/0334299 | A1 | 11/2015 | Tsuneno et al. | |
| 2015/0348385 | A1 | 12/2015 | Lamb et al. | |
| 2016/0084678 | A1 | 3/2016 | Ricks et al. | |
| 2016/0189496 | A1* | 6/2016 | Modi | G08B 13/22 340/545.2 |
| 2016/0275781 | A1 | 9/2016 | Nold | |

* cited by examiner

MONITORING ACCESS

CROSS-REFERENCE TO RELATED APPLICATIONS

This application is a continuation of and claims priority to U.S. patent application Ser. No. 17/025,031, filed Sep. 18, 2020, which is a continuation of U.S. patent application Ser. No. 16/028,246, filed Jul. 5, 2018, now U.S. Pat. No. 10,815,693, which is a continuation of U.S. patent application Ser. No. 14/739,513, filed Jun. 15, 2015, now U.S. Pat. No. 10,047,543, the content of each of which is incorporated herein by reference in its entirety.

BACKGROUND

Building security monitoring systems typically provide for an alarm when an exterior door is opened while the system is armed. The opening of a door is commonly sensed through use of a reed switch attached to the door frame with a corresponding magnet positioned on the door so that the movement of the door magnet, as the door is opened, causes the reed switch to be opened or closed. These existing systems fail to provide information about whether the occupant is entering or leaving or information about activities that stop short of opening the door. Some other existing security monitoring systems provide a device, commonly known as a request-to-exit (REX) device, on or near the interior side of a door, to disable an alarm before an occupant exits the door. Types of REX devices may include interior proximity sensors that detect motion near the interior side of a door, a button mounted on or near the interior side of a door, which can be pressed to enable exit, and a switch built into the inside door handle to disable the alarm when the inside handle is actuated. These existing systems do not provide information about an occupant entering or information about activities on the exterior side of the door that stop short of opening the door. These and other shortcomings are addressed by the present disclosure.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to some embodiments, an apparatus is described for detecting door handle positional information of an interior and an exterior door handle in a door handle set. One or more aspects of the disclosure also provide for a door position sensor for detecting a door open or door closed position. In some embodiments, an alarm module may be connected to at least one of the sensors. In some embodiments, a visual indicator may be provided for indicating an alarm status.

One or more aspects of the disclosure also provide for a method that may include receiving an actuation signal, determining whether the signal is from a sensor associated with an inside door handle or an outside door handle, or interior and exterior portions of any opening mechanism (e.g., pushing surface, a switch to initiate opening or closing, etc.), and performing a first function or a second function, depending on which handle was actuated. In some embodiments the first function may include generating a first audible alarm for a selected period and generating a second audible alarm, subsequent to expiration of the selected period. In some embodiments, the second function may include sounding an alarm, capturing an image, turning on a light or providing a notification via email.

One or more aspects of the disclosure also provide for a method that may include monitoring a position of an inside door handle, monitoring a position of an outside door handle, monitoring a door position, and determining a door state. According to some embodiments, door events, such as an attempted entry, a forced entry and an incomplete entry may be recognized.

According to some embodiments, the methods as disclosed herein may be implemented in relation to windows and other potential entry ways having exterior and/or interior opening portions.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
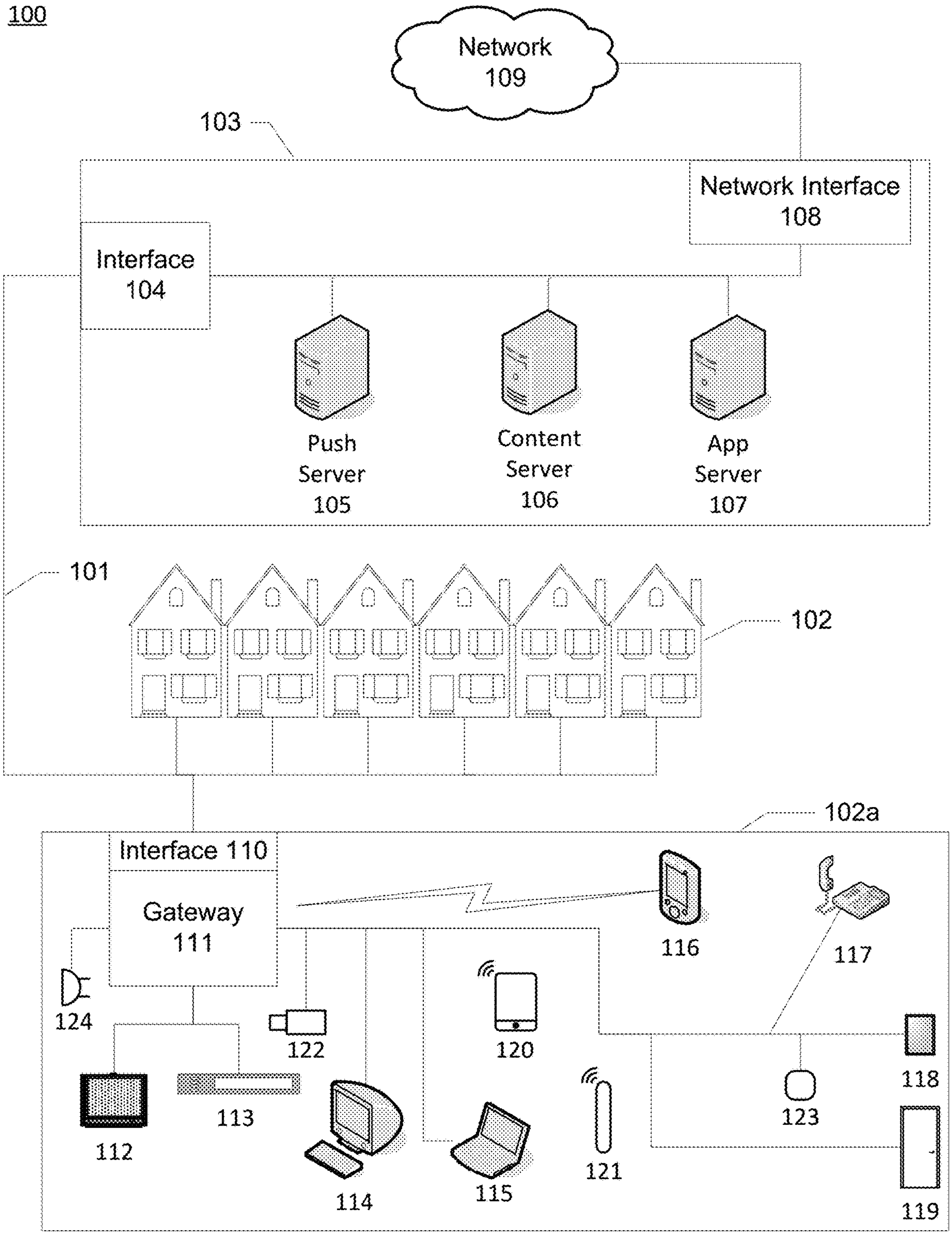
FIG. 1 illustrates an example information access and distribution network that may be used to implement one or more aspects as described herein.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links

101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102*a* may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, home security system 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, ZigBee interfaces and others.

Figure 2:
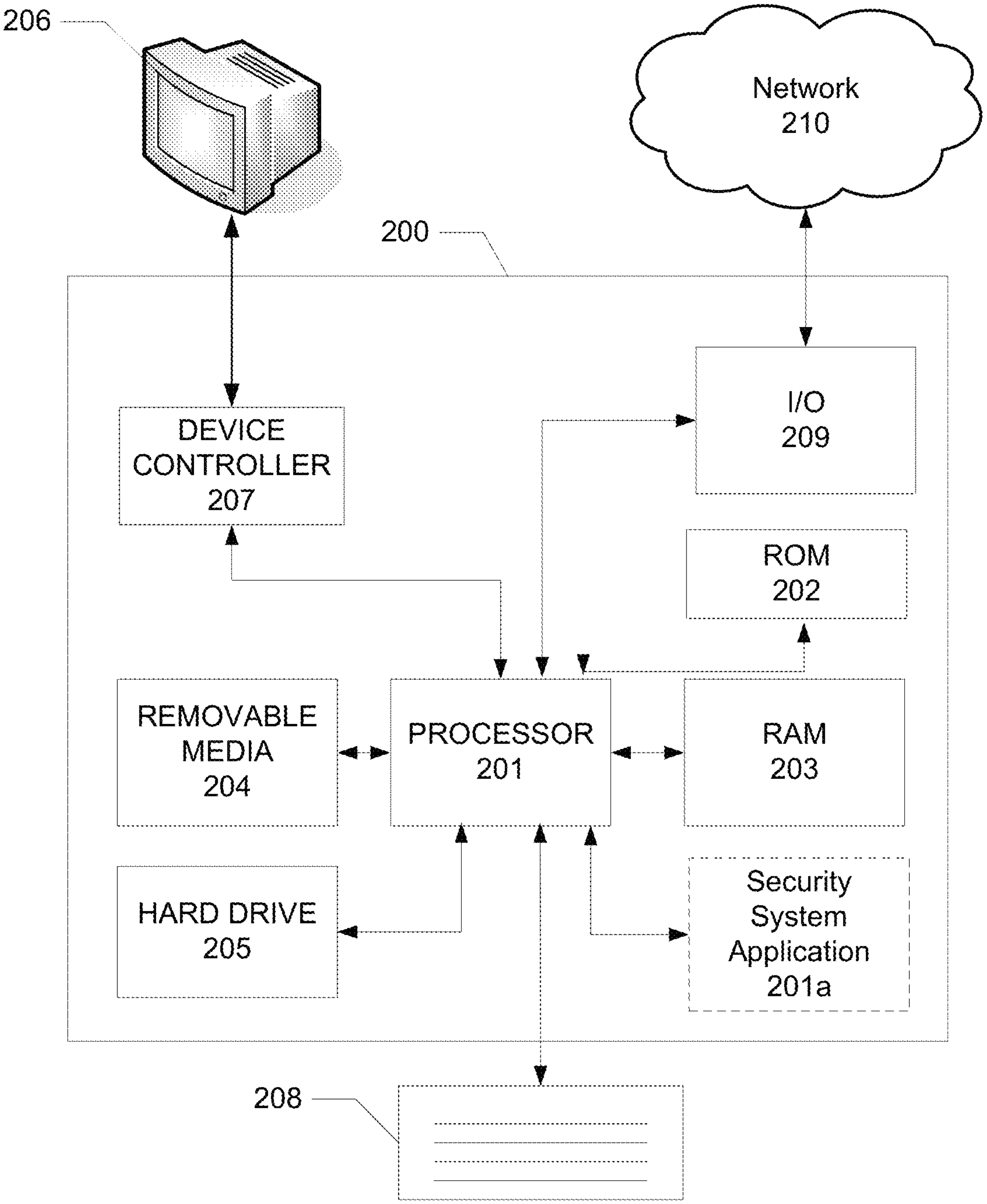
FIG. 2 illustrates an example computing device that may be used to implement one or more aspects as described herein.

FIG. 2 illustrates general hardware elements of an example computing device 200 that can be used to implement one or more aspects of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, Bluetooth interfaces and ZigBee interfaces, for example. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include security system application 201*a* which may enable the device to perform the steps described herein.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
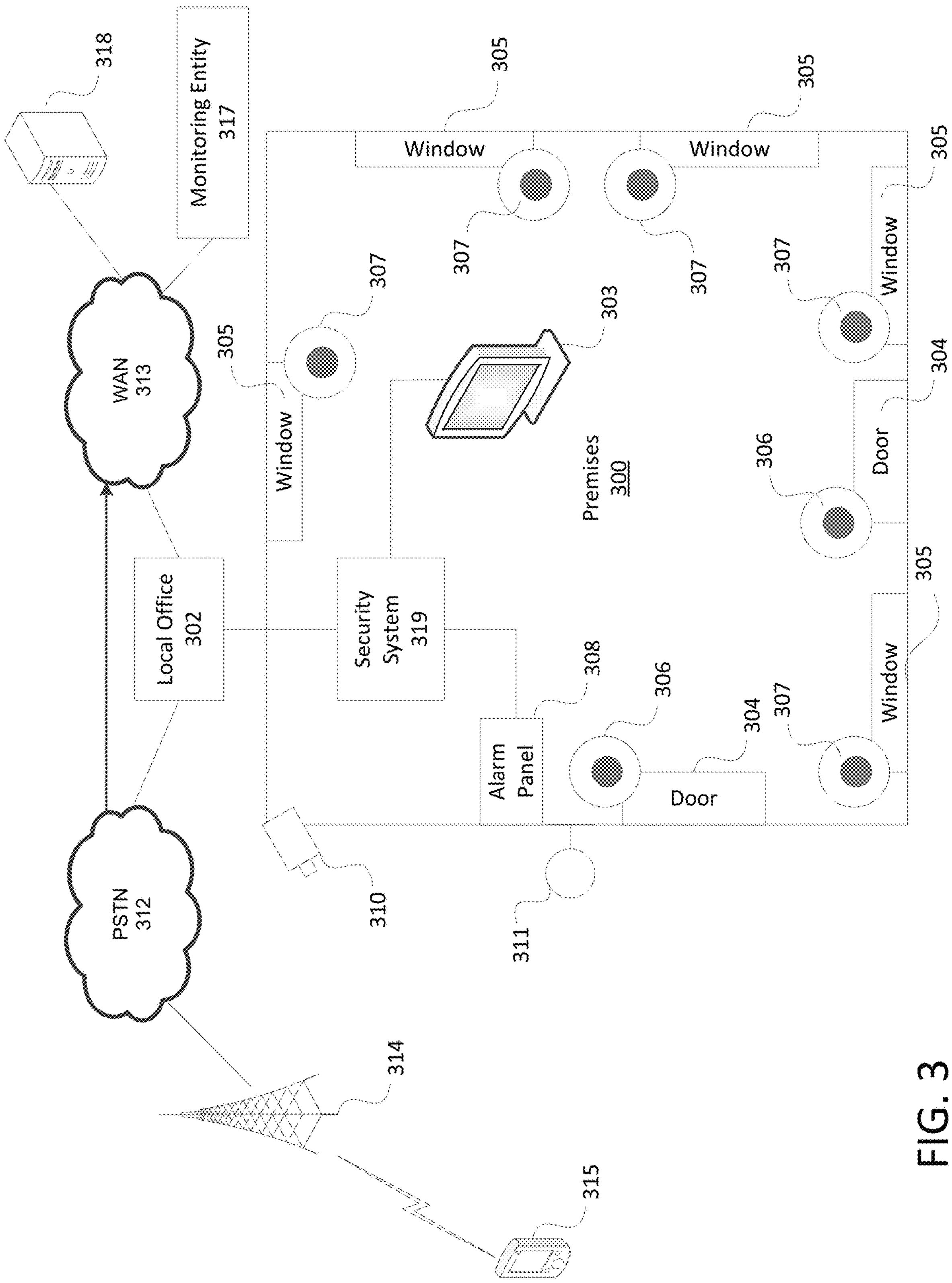
FIG. 3 illustrates an example operating environment in which one or more of the various features described herein may be implemented.

FIG. 3 is a diagram showing an example operating environment in which various features described herein may be performed and implemented. The environment may include premises 300 (which may correspond to premises 102 of FIG. 1), such as a user residence, business, recreational facility, etc. (referred to herein as a user residence or premises in a non-limiting manner), and a local office 302 (which may correspond to the local office 103 of FIG. 1). One or more properties located on premises 300, such as a television 303, may be secured according to one or more aspects described herein. The premises 300 may include one or more doors 304 and a plurality of windows 305. The doors 304 may be secured by one or more associated door security sensors 306. In addition, each of the plurality of windows 305 may be secured by associated window security sensors 307, which may be similar to the door security sensor 306. The security sensors 306 and 307 may be communicatively coupled to a security system 319 (which may correspond to the home security system 119 of FIG. 1), which may allow the security sensors 306 and 307 to be armed, disarmed and monitored. In one arrangement, an alarm panel 308 may be implemented in and/or as part of security system 319. A user may operate alarm panel 308 to arm security sensors 306, such that if a door 304 is opened while the associated security sensor 306 is armed, an alarm will be triggered. Herein, triggering an alarm may result in various actions, for example, playing an alarm sound, presenting an alarm message, turning on/off lights, turning on cameras, etc.

In one arrangement, security system 319 and/or alarm panel 308 may be implemented in computing device 200, for example, with many functions disclosed herein implemented by security system application 201*a*.

In another arrangement, security system 319 and/or alarm panel 308 may be implemented as part of gateway 111 (FIG. 1). Thus, in one example, gateway 111 may be communicatively coupled to security sensors 306 and 307, which may allow gateway 111 to arm, disarm, and/or monitor the security sensors 306 and 307. While the description above focuses on door security sensors 306 and window security sensors 307, many other security sensors and devices may be communicatively coupled to security system 319 and/or gateway 111. For example, the security system 319 may be communicatively coupled to one or more cameras 310, which may record video to monitor the premises 300 and surrounding area.

One or more cameras 310 may be located so as to monitor an access location of the premises 300, such as a door 304 or a window 305. According to various techniques disclosed herein, images captured by a camera 310 associated with a door 304 or a window 305 may be transmitted by the security system 319, for example, as email.

One or more lights 311 may be located so as to illuminate an access location of the premises 300, such as a door 304 or a window 305. According to various techniques disclosed herein, the alarm system 319 may control the light 311 to provide illumination as part of providing an alarm triggered by door sensor 306 or a window sensor 307.

From the example diagram of FIG. 3, various features may be realized. For example, the security sensors 306 and 307, cameras 310, light 311, alarm panel 308, and security system 319 may be communicatively coupled to a user interface device, such as the television 303 (or another type of display). Through the user interface device (e.g., the television 303) an authorized user may configure any of the devices within the security system. Another example feature may include transmitting (e.g., streaming) data (e.g., pictures, video, audio, etc.) from one or more cameras 310 to any of the other devices in the diagram of FIG. 3.

FIG. 3 also shows that the security system 319 may communicate with an external network, such as the local office 302. Thus, the security system 319 may transfer alert signals indicating detected alarm events upstream to the local office 302. This may be particularly desired to counter "smash and grab" scenarios in which an intruder smashes devices of the security system (e.g., alarm panel 308, camera 310, security sensors 306 and 307, etc.) in hopes of disabling the alarm event or preventing recording of the alarm event. In a smash and grab scenario, the security system 319 may transfer alert signals upstream to the local office 302 so that the authorities can be alerted and/or data regarding the alarm event can be captured before the security system is disabled.

Referring to FIG. 3, when an alarm event is detected, the local office 302 may record the alarm event (e.g., store information identifying the sensor(s) that were tripped, their location, recording video and/or audio showing the event that occurred, etc.), determine an appropriate reaction, and/or transmit a signal to an external network, such as the public switched telephone network PSTN 312 or a wide area network WAN 313. In one embodiment, the security system 319 may communicate directly with networks 312 and 313 via the PSTN 312, the local office 302 may transfer an alert signal to a cell tower 314 and ultimately to a designated cellular device 315 (e.g., smartphone, tablet, etc.). Also, through the PSTN 312, the local office 302 may connect to a public safety answering point (PSAP). Thus, the local office 302 may alert authorities of the alarm, so that the authorities may be dispatched to the premises 300.

Additionally, or alternatively, the local office 302 may transfer an alert signal via the WAN 313 (e.g., the Internet) to a monitoring entity 317 and/or a web portal server 318. The monitoring entity 317 may be the same entity as the local office 302 or a third party entity. Regardless, the monitoring entity 317 may be responsible for monitoring the premises 300. This may include responding to alert signals received when the security system detects an alarm event. For example, the monitoring entity 317 may immediately contact the appropriate authorities to dispatch them to the premises 300. Or, when an alert signal is transferred to the monitoring entity 317, this may prompt a representative or automated system of the monitoring entity 317 to call the premises or another designated number to confirm the truthfulness of the alarm event.

Meanwhile, the web portal server 318 may be a computing device capable of providing a web portal through which users may view, on any connected display device, information regarding the security of the premises 300. Users may log-on to the web portal provided by the web portal server 318 and view an alarm event and/or information related to an alarm event, such as what sensor was triggered and when it was triggered. Also, through the web portal, a user may be able to view video of the premises 300 captured by the camera 310 or may be able to check the status of the security system, to see if it is armed. Where the web portal server 318 is coupled to a WAN 313, such as the Internet, the web portal for the premises 300 may be accessed using any device that can connect to the WAN 313, such as a smartphone, tablet, laptop, etc. The web portal may also be used to customize settings, such as schedules, to indicate when and how the security system should operate. For instance, using the web portal, a user may be able to indicate certain times during which the security system should automatically arm itself.

In some embodiments, the web portal may permit a user to view multiple premises 300.

That is, a single interface may allow a user to view status information, video, security settings, etc. for a plurality of premises 300. In some cases, such information may be viewed simultaneously on the web portal. Having a single interface may be desirable to users who have multiple security systems at various remote locations, such as users who own multiple homes or businesses.

Figure 4:
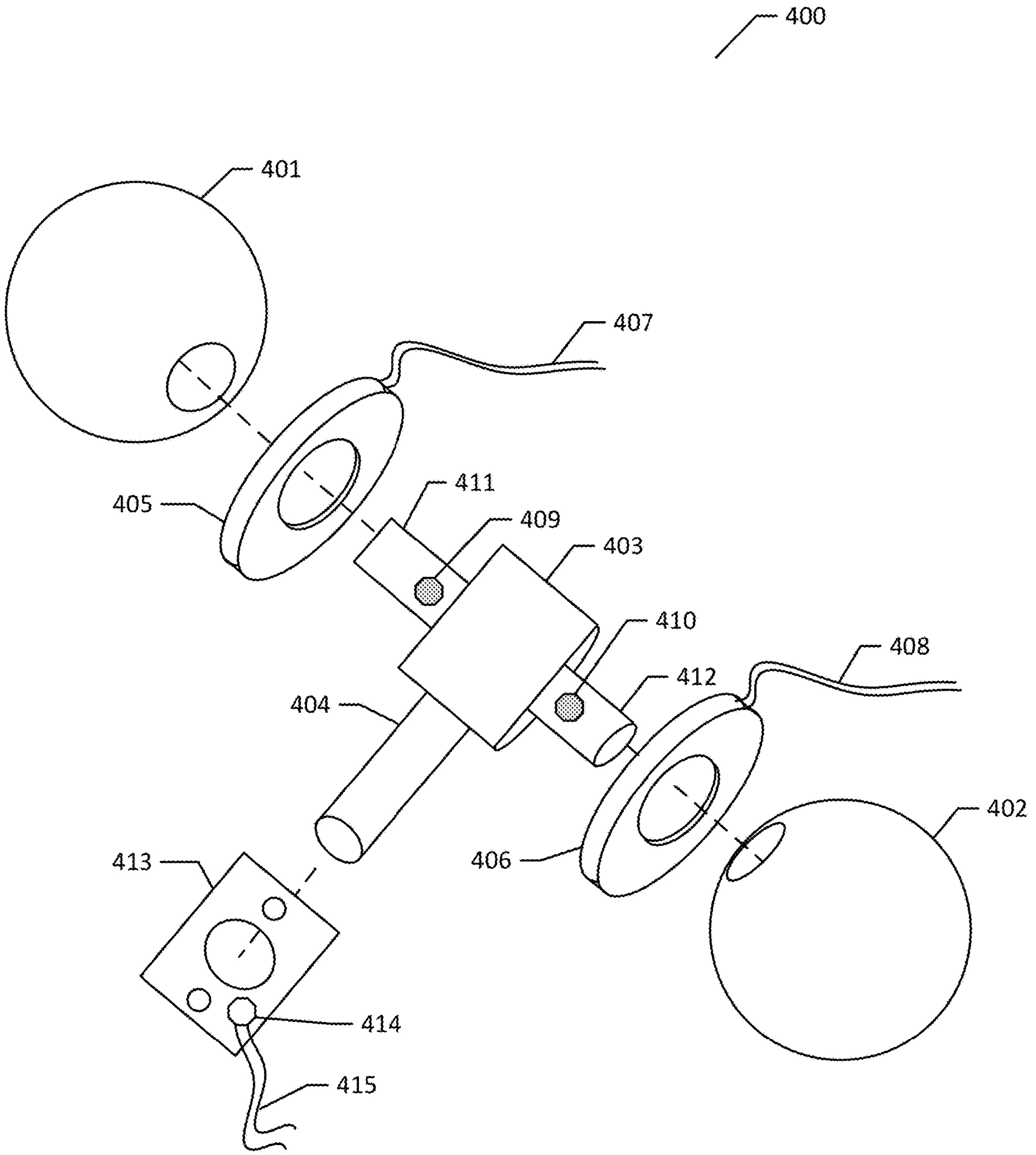
FIG. 4 illustrates an example apparatus in accordance with one or more aspects as described herein.

FIG. 4 illustrates an example door handle set apparatus 400 in accordance with one or more aspects as described herein. A door handle set is provided for exemplary purposes and is not intended to limit the scope of the present disclosure. It is contemplated that window handles and other potential entry devices having exterior and/or interior opening portions may be implemented or modified according to the disclosure.

The apparatus 400 may include an inside door handle 401 and an outside door handle 402. Spherical door handles are depicted in the illustration; however, any style of door handle may be used. In the illustration, a rotating style handle is shown and will be referred to herein. It should be understood that other types of door handle sets may be used, for example, a lever style door handle set. Each door handle may be attached to a spindle 411, 412 in order to operate latch mechanism 403. The door handle 401 may be attached to the spindle 411, through use of a set screw, for example, to secure the handle to the spindle. The latch mechanism 403 may be mortised, cylindrical, or another type. A cylindrical type is depicted in the illustration.

Latch mechanism 403, when operated, may move latch bolt 404 through face plate 413. As an example, door handles 401 and 402 may be mounted on a door where door handle 401 may operate a latch mechanism from an interior space, such as inside a premises 300, and door handle 402 may operate the latch mechanism from an exterior space, such as outside of a premises 300.

Door handles 401 and 402 may each independently operate latch mechanism 403. In other words, door handle 401 may operate latch mechanism 403 without causing door handle 402 to move, and similarly, door handle 402 may operate latch mechanism 403 without causing door handle 401 to move.

The door handle set apparatus 400 may include fixed sensors 405 and 406 (which may correspond to the door sensor 306 or the window sensor 307 of FIG. 3) on spindles 411 and 412, respectively, positioned to detect movement of the spindles. Hall effect sensors are illustrated in the drawing, but it should be known that there are many types of sensors that could be used. For example, a switch may be used, affixed to the spindle or latch mechanism such that rotation of the spindle causes the switch to be actuated. One of a number of position sensors may be used, including a rotary encoder, a capacitive sensor, an inductive sensor, an optical sensors or a potentiometer. Also, sensors 405 and 406 are illustrated as positioned circumferentially to the spindles, as an example. There are many other ways to position the sensor to the same effect, including positioning sensors in door handles 401 and 402. In the example illustration, elements 409 and 410 may be composed of magnetic material in order to provide a means for the sensor element to detect motion. When the spindle rotates, the element 409 or 410, depending on which door handle is operated, moves within sensor 405 or sensor 406, which may produce a signal via conductors 407 or 408 that can be read, for example, by security system 319. Movement of either door handle may be detected at the security system 319, regardless of whether or not the door is subsequently opened.

Referring again to FIG. 4, in some embodiments, face plate 413 may include door position sensor 414 (which may also correspond to door sensor 306 of FIG. 3) in order to detect the door position open or closed. Similarly, in embodiments implemented with windows, a window position sensor (which may also correspond to window sensor 307 of FIG. 3) may be detect the window open or closed. Door position sensor 414 may be a Hall effect sensor, positioned to be close to a magnetic element in the door jamb such that when the door is opened, the element and the sensor become separated, thereby generating a signal. Conductors 415 may connect sensor 414 to a security system 319, in order to communicate the door position signal. Here again, a Hall effect sensor is illustrated, but it should be known that there are many types of sensors that could be used, including a switch which may be actuated upon movement of the door away from the door jamb.

As disclosed above, while FIG. 4 depicts an example door handle set apparatus, it is to be understood that the methods described herein may be implemented for windows and/or other openings.

Figure 5:
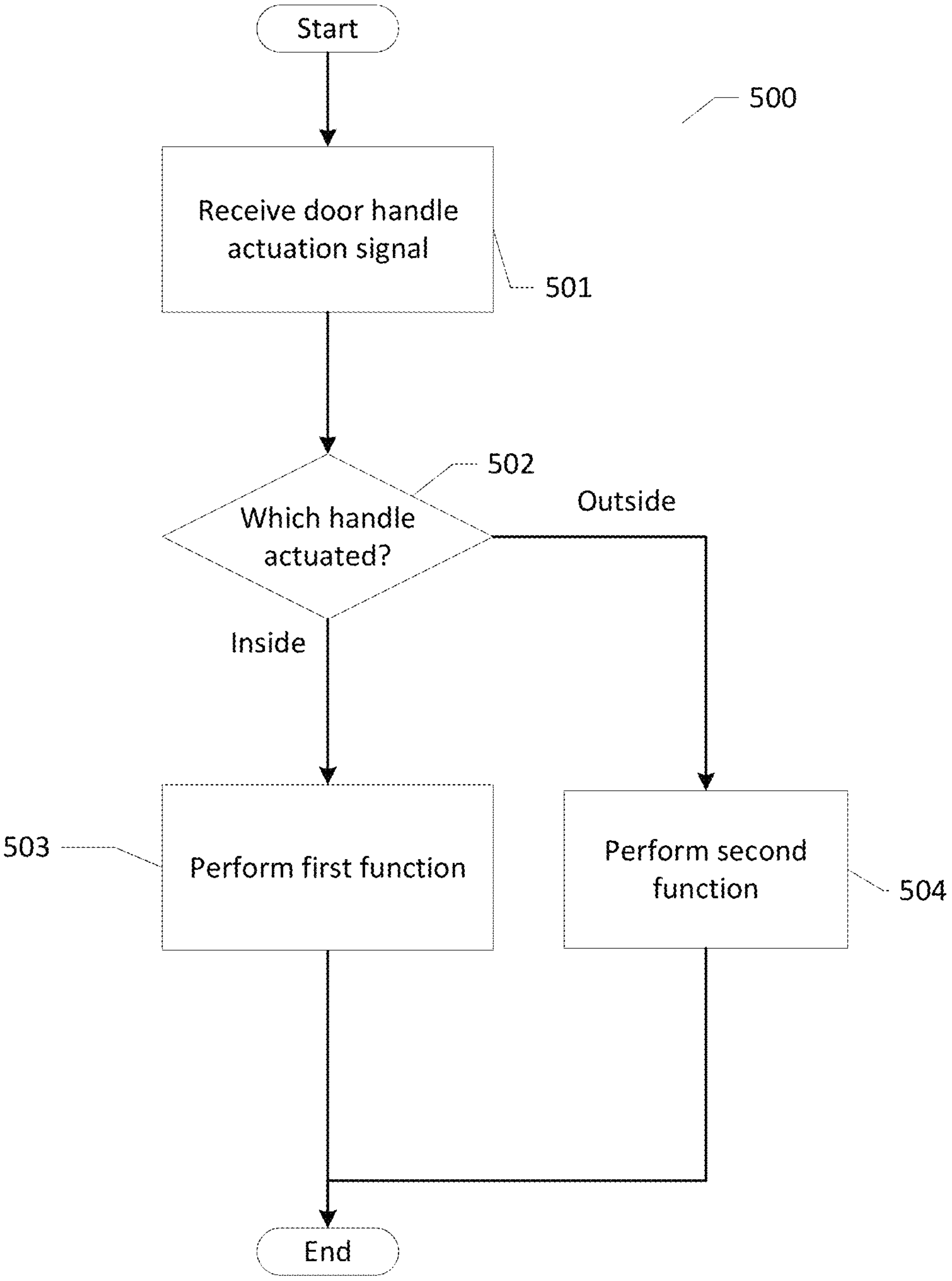
FIGS. 5-6 illustrate example flow charts for performing methods in accordance with one or more aspects as described herein.

FIG. 5 is an exemplary flow diagram illustrating an example process 500 in accordance with one or more disclosed features described herein. At step 501 a door handle actuation signal is received. Although a door is discussed in this example, any other entry point, such as a window, is contemplated as part of the disclosure. At step 502, it is determined which door handle was actuated, for example, the inside handle or the outside handle. If it is determined that the inside handle was actuated, a first function may be performed at step 503. If it is determined that the outside handle was actuated, a second function may be performed at step 504.

In some embodiments, step 503 may include generating a first audible alarm for a particular time period and then generating a second audible alarm after the first alarm. This may be useful in scenarios where an occupant turns an inside door handle to open a door to exit while the alarm system is armed. A first audible alarm might be a chirp or other warning to the user that the alarm system is armed. Continuing the example, after a period of chirp, the main alarm may be generated. The period gives the occupant time to disable the alarm before it goes to next level. In other embodiments, based on user preferences, for example, no alarms or other notifications may be triggered based on opening of the inside portion of the door handle or other device. However, should the door handle on the outside be actuated, in step 504, the full alarm may be triggered.

In still other embodiments, a particular alarm type in steps 503 and 504 may be selected based on the time of day. For example, a first alarm may be used during the day and a second alarm may be used during the night.

In some embodiments, at step 504, a camera 310 may be controlled, by security system 319 for example, to capture an image around the outside door handle, in response to receiving a signal indicative of actuation of the external door handle 402. This may be useful when the outside handle is tested or operated, regardless of whether or not the door is subsequently opened. For example, it would be useful to have photographic evidence of any attempted entry to a premises.

In addition, at step 504, in some embodiments, responsive to actuation of door handle 402, security system 319 may control a light 311 to be turned on, for example, to illuminate the area around the outside of door 304. This illumination may scare off a would-be intruder. In some embodiments, the illumination may make it easier for a user to find their keys, should it be dark outside, and actuation of the door 304 handle may cause the light to come on.

In some embodiments, step 504 may include sending of a notification via email by security system 319 or gateway 111 upon detection of an outside handle actuation signal. Example notifications may include simply a notice of the action and the time of occurrence or the notification may include, for example, an image captured by camera 310, as discussed above. In some embodiments, notifications may be restricted or enabled during certain time periods so as to not annoy an occupant.

In some embodiments, the method illustrated in FIG. 5 may further include an alarm mode and a visual indicator to indicate the alarm mode. In step 503, the alarm mode may be changed automatically upon determining that an inside door handle was actuated. This may be useful, for example, to change the alarm mode from a mode where interior premises proximity sensors are disabled to a mode where they are enabled.

In some embodiments, the alarm system 319 may accept a voice command to disable the alarm. In other embodiments, the voice command may be accepted by handle set 400.

In still other embodiments, door handles 401 and 402 may be actuated to provide input, such as a command, to alarm system 319. For example, the actuation of both door handles may disarm, arm or change the mode of the alarm. A particular sequence of actuating one handle and/or the other may provide input to the alarm system 319. As an example, it may be convenient for a premises occupant to enable the alarm system by actuating the door handles on their way out of the premises. This may save the occupant from having to visit alarm panel 308 to enable the alarm system. As an example, the occupant might actuate the inside door handle (or window handle) once, followed by actuating the outside door handle (or window handle) twice and then the inside door handle (or window handle) once again. This may signal the alarm system 319 to arm the alarm mode. Given these examples, it should be known that there are many other possible commands that may be input through the door handle or window handle manipulation methods as described herein.

In some embodiments, the method of FIG. 5 may further include learning the user or occupant behavior in order to adjust alarm settings or modes. For example, the occupant may set the alarm system 319 to a particular mode at night. The occupant may routinely open the door at a particular time, to let out a pet, for example. The alarm system 319 may keep track of the occupant's interaction with the alarm system and perform steps for the occupant, without the occupant's request. Continuing the example, if the alarm system 319 determines that the occupant routinely opens a door (or window) at 5 am, and the occupant changes an alarm mode to another mode, such as a day mode, at that time, the alarm system 319 may automatically make the change for the occupant.

Figure 6:
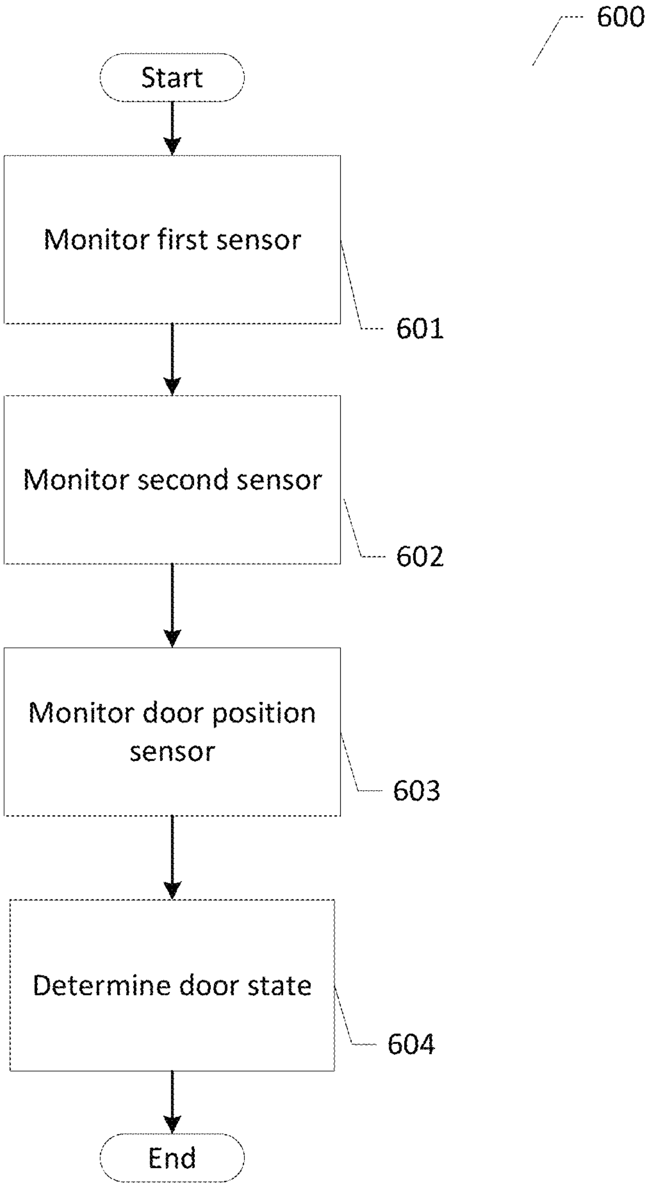

FIG. 6 is an exemplary flow diagram illustrating an example process 600 in accordance with one or more disclosed features described herein. Although a door is being discussed in this example, any other entry point, such as a window, is contemplated as part of the disclosure.

At step 601 a first sensor may be monitored. In some embodiments, the first sensor may provide an indication of the position of an inside door handle.

At step 602 a second sensor may be monitored. In some embodiments, the second sensor may provide an indication of the position of an outside door handle.

At step 603, a door position sensor may be monitored.

At step 604, a door state may be determined. In some embodiments, the door state may include the inside door handle position, the outside door handle position, the door position, and information about whether the door is locked or not.

In some embodiments, the door state at 604 may be compared to a previous door state to determine that a door event has taken place. For example, the door might have been opened following the actuation of the outside door handle. By comparing two door states, for sake of example, two consecutive door states, a change in door state can be determined. In some embodiments, a door state transition table may be created and referred to, in order to interpret the meaning of a door event. This state transition table may be implemented in security system application 201*a*, for example.

In cases where the outside handle 402 is actuated, but the door is not opened, an attempted entry may be determined. An attempted entry may occur, for example, when a would-be intruder tests the door security by turning the door knob to see if the door will open. When an attempted entry is detected, an illumination may be provided by security system 319, in some embodiments, for example, via light 311. Continuing the example, camera 310 may be controlled to capture an image of the would-be intruder. The resulting image may be stored or transmitted to a security service or law enforcement, in some embodiments.

In another embodiment, if the door were opened without the detecting of door handle actuation from inside or outside, a forced entry event may be recognized. A forced entry may occur if a door is kicked in, for example. In other words, the door was opened, but not by the normal means of actuating a door handle. In this example, various responses may be contemplated, including the immediate sounding of an alarm by the security system 319 and the notification of monitoring entity 317.

In still another embodiment, if a door is opened using an exterior door handle 402, but not subsequently closed, an incomplete entry may be recorded. This may indicate that someone entered but failed to close the door. This may be important to know, for example, if there are pets or children among the occupants. In this embodiment, alarm system 319 may provide a particular alert or notification.

In still another embodiment, if a door is opened using an interior door handle 401, but not subsequently closed, an incomplete exit may be recorded. This may indicate that someone exited but failed to close the door. This may be important to know, for example, when there might be no more occupants on the premises and the door has been left open by the last occupant leaving.

In some other embodiments, if a door is opened, triggering an alarm, information about which of the interior or exterior door handles was actuated, if any, will allow a user to better understand the scenario that triggered the alarm. For example, the alarm may have been triggered by an entry or an exit.

Even in embodiments where the alarm may not be enabled, if a door is opened via actuation of a door handle, information about which of the interior or exterior door handles was actuated, will allow a user to better understand the scenario. For example, someone may have entered or exited the premises.

The responses to the above embodiments may be user configurable in the security system 319. They may also be dependent on the time of day.

It can be seen that by having information about inside and outside door handle actuation, among other things, a security system can provide a more complete security status to a user and provide the beneficial functions as described herein.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:

receiving, from one or more sensor devices, first sensor data indicating an interior entry point handle state;

receiving, from the one or more sensor devices, second sensor data indicating an exterior entry point handle state; and causing, based on a difference between the interior entry point handle state and the exterior entry point handle state indicating motion of an exterior entry point handle, activation of an alarm state.

2. The method of claim 1, wherein the causing the activation of the alarm state comprises determining that the difference satisfies a threshold.

3. The method of claim 1, wherein the interior entry point handle state indicates that an interior entry point handle has not moved.

4. The method of claim 1, further comprising:

determining the difference between the interior entry point handle state and the exterior entry point handle state by determining that one or both of the interior entry point handle state or the exterior entry point handle state match an actuation pattern.

5. The method of claim 1, wherein the causing the activation of the alarm state comprises:

activating a video camera based on the motion of the exterior entry point handle.

6. The method of claim 1, wherein the causing the activation of the alarm state comprises:

activating a light based on the motion of the exterior entry point handle.

7. An apparatus comprising:

one or more processors; and memory storing instructions that, when executed by the one or more processors, cause the apparatus to:

receive, from one or more sensor devices, first sensor data indicating an interior entry point handle state;

receive, from the one or more sensor devices, second sensor data indicating an exterior entry point handle state; and cause, based on a difference between the interior entry point handle state and the exterior entry point handle state indicating motion of an exterior entry point handle, activation of an alarm state.

8. The apparatus of claim 7, wherein the instructions, when executed by the one or more processors, cause the apparatus to cause the activation of the alarm state based on determining that the difference satisfies a threshold.

9. The apparatus of claim 7, wherein the interior entry point handle state indicates that an interior entry point handle has not moved.

10. The apparatus of claim 7, wherein the instructions, when executed by the one or more processors, further cause the apparatus to:

determine the difference between the interior entry point handle state and the exterior entry point handle state by determining that one or both of the interior entry point handle state or the exterior entry point handle state match an actuation pattern.

11. The apparatus of claim 7, wherein the instructions, when executed by the one or more processors, cause the apparatus to cause the activation of the alarm state by causing the apparatus to:

activate a video camera based on the motion of the exterior entry point handle.

12. The apparatus of claim 7, wherein the instructions, when executed, cause the causing the activation of the alarm state by causing:

activating a light based on the motion of the exterior entry point handle.

13. The method of claim 1, wherein the first sensor data is received from a first sensor device of the one or more sensor devices, and wherein the second sensor data is received from a second sensor device of the one or more sensor devices.

14. The apparatus of claim 7, wherein the first sensor data is received from a first sensor device of the one or more sensor devices, and wherein the second sensor data is received from a second sensor device of the one or more sensor devices.

15. A system comprising:

a computing device, and one or more sensor devices, wherein the computing device is configured to:

receive, from the one or more sensor devices, first sensor data indicating an interior entry point handle state;

receive, from the one or more sensor devices, second sensor data indicating an exterior entry point handle state; and cause, based on a difference between the interior entry point handle state and the exterior entry point handle state indicating motion of an exterior entry point handle, activation of an alarm state; and wherein at least one of the one or more sensor devices is configured to:

monitor the motion of the exterior entry point handle.

16. The system of claim 15, wherein the computing device is configured to cause the activation of the alarm state based on determining that the difference satisfies a threshold.

17. The system of claim 15, wherein the interior entry point handle state indicates that an interior entry point handle has not moved.

18. The system of claim 15, wherein the computing device is configured to determine the difference between the interior entry point handle state and the exterior entry point handle state by determining that one or both of the interior entry point handle state or the exterior entry point handle state match an actuation pattern.

19. The system of claim 15, wherein the computing device is configured to cause the activation of the alarm state by:

activating a video camera based on the motion of the exterior entry point handle.

20. The system of claim 15, wherein the computing device is configured to cause the activation of the alarm state by:

activating a light based on the motion of the exterior entry point handle.

21. The system of claim 15, wherein the first sensor data is received from a first sensor device of the one or more sensor devices, and wherein the second sensor data is received from a second sensor device of the one or more sensor devices.

* * * * *